(12) United States Patent
Anshel et al.

(10) Patent No.: US 8,972,715 B2
(45) Date of Patent: Mar. 3, 2015

(54) CRYPTOGRAPHIC HASH FUNCTION

(75) Inventors: Iris Anshel, Tenafly, NJ (US); Dorian Goldfeld, Tenafly, NJ (US)

(73) Assignee: SecureRF Corporation, Shelton, CT (US)

(*) Notice: Subject to any disclaimer, the term of this patent is extended or adjusted under 35 U.S.C. 154(b) by 172 days.

(21) Appl. No.: 13/548,325

(22) Filed: Jul. 13, 2012

(65) Prior Publication Data
US 2014/0019747 A1 Jan. 16, 2014

(51) Int. Cl.
G06F 21/00 (2013.01)
H04L 9/06 (2006.01)

(52) U.S. Cl.
CPC .................................... *H04L 9/0643* (2013.01)
USPC ............................... 713/150; 380/44; 380/28

(58) Field of Classification Search
None
See application file for complete search history.

(56) References Cited

U.S. PATENT DOCUMENTS 7,933,404 B2 * 4/2011 Venkatesan et al. ............. 380/28
2010/0246809 A1 * 9/2010 Noda et al. ....................... 380/28

* cited by examiner

*Primary Examiner* — Samson Lemma
*Assistant Examiner* — Malcolm Cribbs
(74) *Attorney, Agent, or Firm* — Moritt Hock & Hamroff LLP; Steven S. Rubin, Esq.

(57) ABSTRACT

A first module divides a string into blocks. A second module associates the blocks with monoid elements in a list of first monoid elements to produce second monoid elements. A third module applies a first function to an initial monoid element and a first of the second monoid elements producing a first calculated monoid element and evaluates an action of the initial monoid element on the first function producing a second function. A fourth module applies the second function to the first calculated monoid element and to a second of the second monoid elements producing a second calculated monoid element and evaluates the action of the first calculated monoid element on the first function producing a third function. Further modules iteratively, corresponding to the number of blocks, apply the produced function to calculated monoid elements and the second monoid elements to produce a hash of the string

20 Claims, 2 Drawing Sheets

CRYPTOGRAPHIC HASH FUNCTION

BACKGROUND OF THE INVENTION

A cryptographic hash function may be used to transform a large block of a string of data into a smaller block of hash data. In some examples, the hash data may then be used as an identifier for the string or for a processor in communication with the string. The transformation may be such that recreating the string may be impractical, difficult, or infeasible. In some situations, it may also be difficult or infeasible to find two strings that may be transformed to the same hash.

SUMMARY OF THE INVENTION

One embodiment of the invention is a device effective to generate a hash of a string. The device may comprise a memory. The memory may be effective to include a first function, a first list of first monoid elements, and an initial monoid element. The device may further include a first module effective to receive the string and divide the string into a sequence of blocks. The device may further include a second module in communication with the first module and the memory, the second module effective to associate blocks in the sequence of blocks with respective monoid elements in the first list of first monoid elements to produce a second list of second monoid elements. The device may further include a third module in communication with the second module and with the memory. The third module may be effective to receive a first one of the second monoid elements, receive the initial monoid element, receive the first function, apply the first function to the initial monoid element and the first one of the second monoid elements to produce a first calculated monoid element, and evaluate an action of the initial monoid element on the first function to produce a second function. The device may further include a fourth module in communication with the second module and the third module. The fourth module may be effective to receive a second one of the second monoid elements, receive the first calculated monoid element, receive the second function, and apply the second function to the first calculated monoid element and to the second one of the second monoid elements to produce a second calculated monoid element.

Another embodiment of the invention includes a method for generating a hash of a string. The method may include receiving the string by first module. The method may include dividing the string by the first module into a sequence of blocks and receiving, by a second module, the sequence of blocks. The method may include associating, by the second module, blocks in the sequence of blocks with respective monoid elements in a first list of monoid elements to produce a second list of second monoid elements. The method may include receiving, by a third module a first one of the second monoid elements. The method may include receiving, by the third module, an initial monoid element; receiving, by the third module, a first function; applying, by the third module, the first function to the initial monoid element and the first one of the second monoid elements to produce a first calculated monoid element; and evaluating, by the third module, an action of the initial monoid element on the first function to produce a second function. The method may include receiving, by a fourth module, a second one of the second monoid elements; receiving, by the fourth module, the first calculated monoid element; receiving, by the fourth module, the second function; and applying, by the fourth module, the second function to the first calculated monoid element and to the second one of the second monoid elements to produce a second calculated monoid element.

Another embodiment of the invention is a system effective to communicate a hash of a string. The system may include a first device and a second device in communication with the first device over a network. The first device may include a first memory. The first memory may include a first function, a first list of first monoid elements, and an initial monoid element. The first device may further include a first module effective to receive the string and divide the string into a sequence of blocks. The first device may further include a second module in communication with the first module and the first memory, the second module effective to associate blocks in the sequence of blocks with respective monoid elements in the first list of monoid elements to produce a second list of second monoid elements. The first device may further include a third module in communication with the second module and with the first memory, the third module effective to receive a first one of the second monoid elements, receive the initial monoid element, receive the first function, apply the first function to the initial monoid element and the first one of the second monoid elements to produce a first calculated monoid element, and evaluate an action of the initial monoid element on the first function to produce a second function. The first device may further include a fourth module in communication with the second module and the third module, the fourth module effective to receive a second one of the second monoid elements, receive the first calculated monoid element, receive the second function, and apply the second function to the first calculated monoid element and to the second one of the second monoid elements to produce a second calculated monoid element. The fourth module may further be effective to receive the first function, and evaluate the action of the first calculated monoid element on the first function to produce a third function. The first device may further include a fifth module in communication with the second module and the fourth module. The fifth module effective to receive the third function, receive a third one of the second monoid elements, receive the second calculated monoid element, and apply the third function to the second calculated monoid element and the third one of the second monoid elements to produce the hash of the string. The second device effective to receive the hash; and compare the hash with data stored in a second memory in communication with the second device to produce an identification of the first device.

BRIEF DESCRIPTION OF THE FIGURES

The foregoing and other features of this disclosure will become more fully apparent from the following description and appended claims taken in conjunction with the accompanying drawings. Understanding that these drawings depict only some embodiments in accordance with the disclosure and are therefore not to be considered limiting of its scope, the disclosure will be described with additional specificity and detail by reference to the accompanying drawings in which:

DETAILED DESCRIPTION OF THE PREFERRED EMBODIMENT(S)

Figure 1:
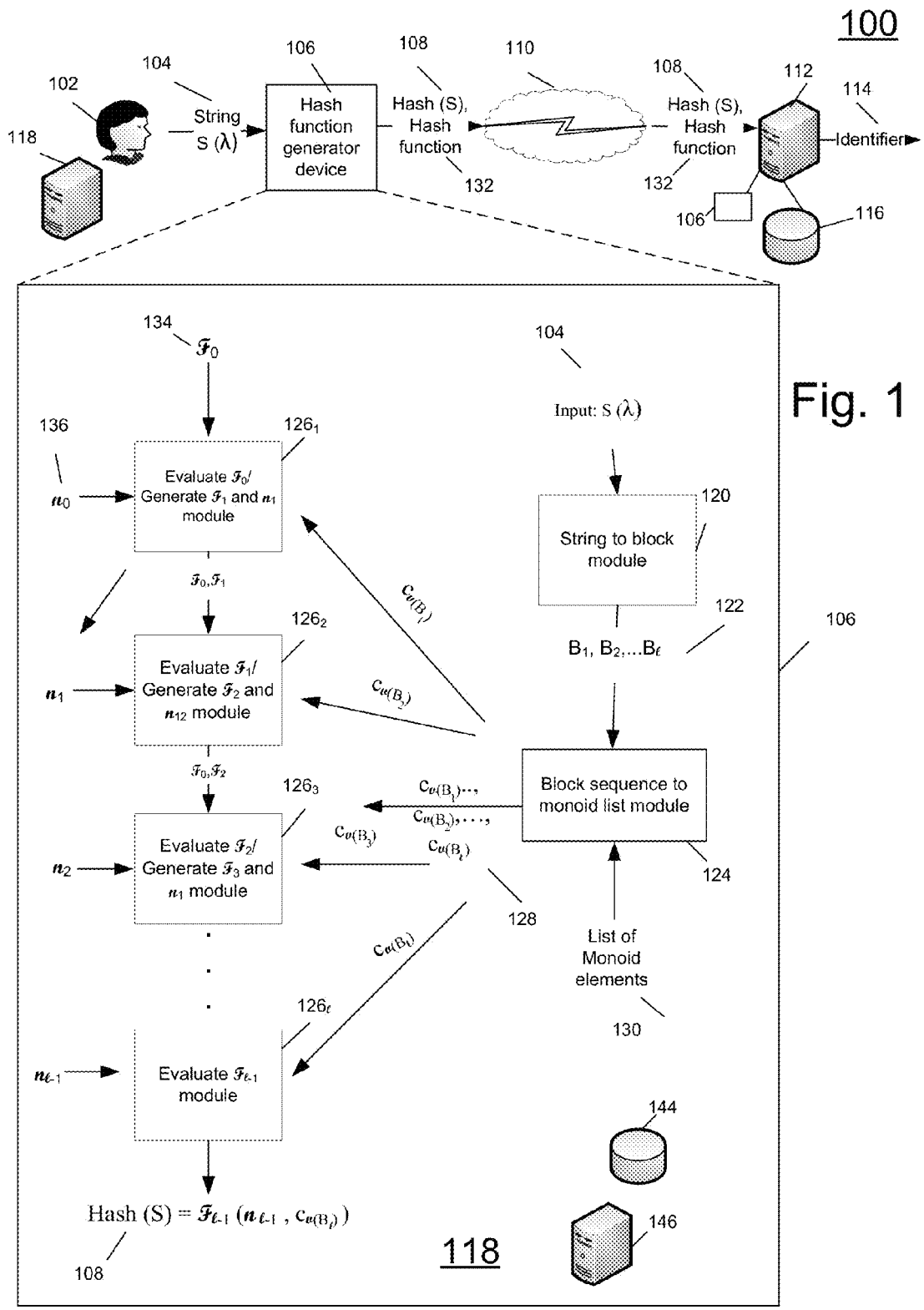
FIG. 1 is a system drawing of a cryptographic hash generation system in accordance with an embodiment of the invention.

In the following detailed description, reference is made to the accompanying drawings which form a part thereof. In the drawings, similar symbols typically identify similar components unless context indicates otherwise. The illustrative embodiments described in the detailed description, drawings and claims are not meant to be limiting. Other embodiments may be utilized and other changes may be made without departing from the spirit or scope of the subject matter presented herein. It will be readily understood that the aspects of the present disclosure as generally described herein and as illustrated in the accompanying figures can be arranged, substituted, combined, separated and/or designed in a wide variety of different configurations all of which are explicitly contemplated herein.

Referring to FIG. 1, there is shown a cryptographic hash generation system 100 which may be used in accordance with an embodiment of the invention. In system 100, a user 102 may input a string 104 into a hash function generator device 106. For example, user 102 may use a processor 118 to input string 104. As discussed in more detail below, hash function generator 106 may be effective to transform string 104 into a hash of string H(S) 108. In some examples, hash function generator device 106 and/or processor 118 may further send hash 108 and hash function 132 over a network 110. Network 110 may include, for example, a wireless network, a wired network, the Internet, a cellular network, a near field communication (NFC) network, a radio frequency identification (RF-ID) network, a cloud computing environment, etc.

A processor 112, in communication with network 110, may receive hash 108 and hash function 132. Processor 112 may compare hash 108 using hash function 132 with data stored in a memory 116. Based on the comparison by processor 112, processor 112 may generate an identifier 114 for user 102 and/or processor 118. For example, processor 112 may be a reader and processor 118 may be a tag in an RF-ID environment. Hash 108 could be a transformation of a public key used in public key encryption communication between tag/processor 118 and reader/processor 112. Reader/processor 112 may compare hash 108 with data in memory 116 to determine which public key/identifier 114 will be used by tag 118.

Hash function generator device 106 may include a string to block decomposition module 120, a block sequence to monoid list module 124, and two or more function evaluation/generation modules 126. At least some of these modules may be in communication with a memory 144 and/or a processor 146. Processor 146 could have a relatively small processing power such as with a 5 MHz clock cycle. Memory 144 could have a relatively small size and have, for example, 1 kb of memory. Modules could be implemented as software such as with a processor and/or in hardware or firmware.

String 104 may be a sequence of bits with a number of bits that is a multiple of a variable $\lambda$. Hash function generator device 106 may send string 104 as an input to a string to block module 120. String to block module 120 may be effective to divide string 104 into a sequence of blocks 122 ($B_1, B_2, \ldots B_l$), each with a length of $\lambda$ bits. In the example, string 104 is divided into l blocks, where each block is of a length of $\lambda$ bits. In situations where string 104 includes a number of bits that is not equally divisible by $\lambda$, string to block module 120 may add padding bits to produce a modified string with a number of bits that is equally divisible by $\lambda$.

String to block module 120 may send sequence of blocks 122 to a block sequence to monoid list module 124. Block sequence to monoid list module 124 may also receive a first list of monoid elements 130. List of monoid elements 130 may be stored in a memory 144. Monoid elements may be, for example, matrices with entries in a finite field.

Each block B in sequence of blocks 122 includes bits in a binary format that may represent a number with a value v between 0 and $2^\lambda-1$. The value may be denoted by $v(B_i)$. Block sequence to monoid list module 124 may transform sequence of blocks 122 into a corresponding sequence of numbers $v(B_1), \ldots v(B_l)$. Block sequence to monoid list module 124 may then associate each value $v(B_i)$, and hence each block $B_i$, with a monoid element $c_v(B_i)$ in list of monoid elements 130 to produce a second list of monoid elements 128 $c_v(B_1), \ldots, c_v(B_2), \ldots, c_v(B_l)$. Monoid elements 128 may be sent to respective function evaluation/generation modules 126. For example, $c_v(B_1)$ may be sent to function evaluation/generation module $126_1$, $c_v(B_i)$ may be sent to function evaluation/generation module $126_i$, etc.

Each function evaluation/generation module $126_i$ receives a respective monoid element $c_v(B_i)$ from second list of monoid elements 128, a function $\mathcal{F}_{i\,i-1}$, and a monoid element $n_{i-1}$. Each function evaluation/generation module 126 acts on these inputs to produce an output. For example, function evaluation/generation module $126_1$ receives monoid element $c_v(B_1)$, initial function $\mathcal{F}_{i\,o}$ 134 and initial monoid element $n_o$ 136. Initial function $\mathcal{F}_{i\,o}$ may be a one-way function as discussed below and may be stored in memory 144. Monoid element $n_o$ could be, example, a matrix with mod p entries, and may be stored in memory 144. Function evaluation/generation module $126_1$ may apply function $\mathcal{F}_{i\,o}$ to $n_o$ and to $c_v(B_i)$ to produce monoid element $n_1$.

$$n_1 = \mathcal{F}_{i\,o}(n_o, c_v(B_1))$$

Function evaluation/generation module $126_1$ may also evaluate the action of $n_0$ on initial function $\mathcal{F}_{i\,o}$ to produce a new function $\mathcal{F}_{i\,1}$.

$$\mathcal{F}_{i\,1} = n_0 \circ \mathcal{F}_{i\,o}$$

Function evaluation/generation module $126_1$ may send $n_1$, initial function $\mathcal{F}_{i\,o}$, and new function $\mathcal{F}_{i\,1}$ to function evaluation/generation module $126_2$.

Function evaluation/generation module $126_2$ receives monoid element $c_v(B_2)$, initial function $\mathcal{F}_{i\,o}$, function $\mathcal{F}_{i\,1}$ and monoid element $n_1$. Function evaluation/generation module $126_2$ may apply function $\mathcal{F}_{i\,1}$ to $n_l$ and to $c_v(B_2)$ to produce monoid element $n_2$ $$n_2 = \mathcal{F}_{i\,1}(n_1, c_v(B_2))$$

Function evaluation/generation module $126_2$ may evaluate the action of $n_1$ on initial function $\mathcal{F}_{i\,o}$ to produce a new way function $\mathcal{F}_{i\,2}$.

$$\mathcal{F}_{i\,2} = n_1 \circ \mathcal{F}_{i\,o}$$

Function evaluation/generation module $126_2$ may forward $n_2$, initial function $\mathcal{F}_{i\,o}$, and new function $\mathcal{F}_{i\,2}$ to function evaluation/generation module $126_3$.

This iterative process of generating monoid elements $n_i$ and new functions $\mathcal{F}_{i\,i}$ continues for each block in sequence of blocks 128. For example, function evaluation/generation module $126_3$ receives monoid element $c_v(B_3)$, initial function $\mathcal{F}_{i\,o}$, function $\mathcal{F}_{i\,2}$ and monoid element $n_2$. Function evaluation/generation module $126_3$ may apply function $\mathcal{F}_{i\,2}$ to $n_2$ and to $c_v(B_3)$ to produce monoid element $n_3$.

$$n_3 = \mathcal{F}_{i\,2}(n_2, c_v(B_3))$$

Function evaluation/generation module $126_3$ may evaluate the action of $n_2$ on initial function $\mathcal{F}_{i\,o}$ to produce a new function $\mathcal{F}_{i\,3}$.

$$\mathcal{F}_{i\,3} = n_2 \circ \mathcal{F}_{i\,o}$$

The last monoid element $c_v(B_l)$ in list of monoid elements 128 produced by block sequence to monoid list module 124 is sent to function evaluation/generation module $126_{l-1}$.

Function evaluation/generation module $126_{l-1}$ receives monoid element $c_{v(B_l)}$, function $\mathcal{F}_{i\,l-1}$ and monoid element $n_{l-1}$. Function evaluation/generation module $126_{l-1}$ may produce Hash (S) 108.

$$\text{Hash }(S) = \mathcal{F}_{i\,l-1}(n_{l-1}, c_{v(B_l)})$$

Hash(S) 108 may be sent from processor 118 to processor 112 over network 110. Processor 118 may also send hash function 132 which may include initial function $\mathcal{F}_{i\,0}$, list of monoid elements 130, and initial monoid element $n_o$. Processor 118 may receive hash 108 and compare hash 108 with a list of hash values in memory 116. In another example, processor 118 may receive hash function 132, apply hash function 132 to values in memory 116 (using hash function generator device 106) and determine which resultant hash matches hash 108. For example, passwords may be maintained in memory 116. Processor 112 may apply hash function 132 to each password and identify which password corresponds to hash 108.

Function $\mathcal{F}_i$ may be a one-way function that is computable but difficult, perhaps infeasible, to reverse. In an example, an instance of a one-way function based symmetric encryption protocol utilizes an Algebraic Eraser. An Algebraic Eraser may include a specified 6-tuple $(M \ltimes S, N, \Pi, E, A, B)$ where M and N are monoids,
S is a group that acts on M (on the left),
$M \ltimes S$ denotes the semi-direct product,
A and B denote submonoids of $M \ltimes S$, and
$\Pi$ denotes a monoid homomorphism from M to N. The
E-function, also called E-multiplication, is defined by $$E: (N \times S) \times (M \ltimes S) \rightarrow (N \times S)$$

$$E((n,s),(m_1,s_1)) = (n\Pi(^s m_1), ss_1).$$

It is observed that the E-function satisfies the following identity:

$$E((n,s), ((m_1,s_1) \cdot (m_2,s_2))) = E(E((n,s),(m_1,s_1)),(m_2,s_2)).$$

Function $\mathcal{F}_i$ may be an Algebraic Eraser $(M \ltimes S, N, \Pi, E, A, B)$. Letting $M = M \ltimes S$, $N = N \ltimes S$, function $\mathcal{F}_i$ is defined as follows: given $(n_0, s_0) \in N \ltimes S$ and $(m, s_1) \in M \ltimes S$ let $\mathcal{F}_i: N \times M \rightarrow N$ denote the function:

$$\mathcal{F}_i((n_1,s_1),(m,s_2)) = E((n_1,s_1),(m,s_{12})) = ((n_1\Pi(^{s_1}m), s_1 s_2).$$

The structure of the one-way function F enables the following definition of a new one-way function via a left action. Given an arbitrary element $(n_0, s_0) \in N$, and $\mathcal{F}_i$ as specified above, the one-way $\{(n_0,s_0) \circ \mathcal{F}_i\}$ is defined by $$\{(n_0,s_0) \circ \mathcal{F}_i\}((n_1,s_1),(m_2,s_2)) = ((n_1\Pi(^{s_0 s_1}m_2), s_1 s_2)$$

where $(n_1,s_1) \in N \ltimes S$ and $(m_2,s_2) \in M \ltimes S$. A feature of these specified actions is that the property $$\{(n_0,s_0) \circ \mathcal{F}_i\}((n_1,s_1),(m_2,s_2) \cdot (m_3,s_3)) = \{(n_0,s_0) \circ F\}(\{(n_0,s_0) \circ F\}((n_1,s_1),(m_2,s_2)),(m_3,s_3)),$$

for all $(n_1,s_1) \in N \ltimes S$ and $(m_2,s_2)$, $(m_3,s_3) \in M \ltimes S$. An application of this feature is that the one-way function $(n_0, s_0) \circ \mathcal{F}_i$ can be evaluated incrementally, and thus efficiently.

Given a one-way function $\mathcal{F}_{i\,0}$, the collection of one-way functions $$\{(n_0,s_0) \circ F | (n_0,s_0) \in N \ltimes S\}$$

satisfies the requirements for the class of one-way functions described above for initial function $\mathcal{F}_{i\,0}$. The sequence of one-way functions that appear in FIG. 1 may take the form:

$$\mathcal{F}_{i\,0}, \{(n_0,s_0) \circ \mathcal{F}_{i\,0}\}, \{(n_1,s_1) \circ \mathcal{F}_{i\,0}\}, \{(n_2,s_2) \circ \mathcal{F}_{i\,0}\}, \ldots$$

Another instance of a function that may be used is a function where monoids M and N are chosen to be a group G. Defining relators of G may allow for an effective rewriting or cloaking of group elements, and a conjugacy equation in G may be relatively difficult to solve. This insures that the function $\mathcal{F}_i: G \times G \rightarrow G$ defined by the equation, $$\mathcal{F}_i(x,g) = g^{-1} \times g$$

where $x, g \in G$, is a one-way function. Given a group element, $x_0 \in G$, define the left action of $x_0$ on the one-way function $\mathcal{F}_i$ by $$\{x_0 \circ \mathcal{F}_i\}(x,g) = g^{-1} x_0^{-1} \times x_0 g.$$

As with the previous example, $$\{x_0 \circ \mathcal{F}_i\}(x, g_1 g_2) = \{x_0 \circ \mathcal{F}_i\}(\{x_0 \circ \mathcal{F}_i\}(x, g_1)), g_2).$$

The collection of one-way functions, $$\{\{x_0 \circ \mathcal{F}_i\} | x_0 \in G\},$$

satisfies the requirements for the class of one-way functions described above for initial function $\mathcal{F}_{i\,0}$.

Among other benefits, a system in accordance with this disclosure may enable a processor to relatively quickly compute the hash of each block of a message, and, thereby, quickly compute the hash of the entire message itself. Long messages may be transformed into a shortened message due to, at least in part, the ability to break the message into smaller pieces. A hash of the message may then be generated, by first hashing the first block using, the output of which is then used to hash the second block, and then proceeding iteratively until the hash of the final block is obtained using. A signature may then be applied to the hash of the message. Functions used in producing the hash may be derived from previously used functions based on actions of monoid elements. As each iterative step may use a relatively quick to process function, the entire hash generation process may be relatively fast. As each function is mutated in subsequent steps, it would be very difficult, perhaps infeasible, to guess all of the functions used in generating the hash. Changing values of monoid elements and/or the initial monoid element may produce new hash functions.

Figure 2:
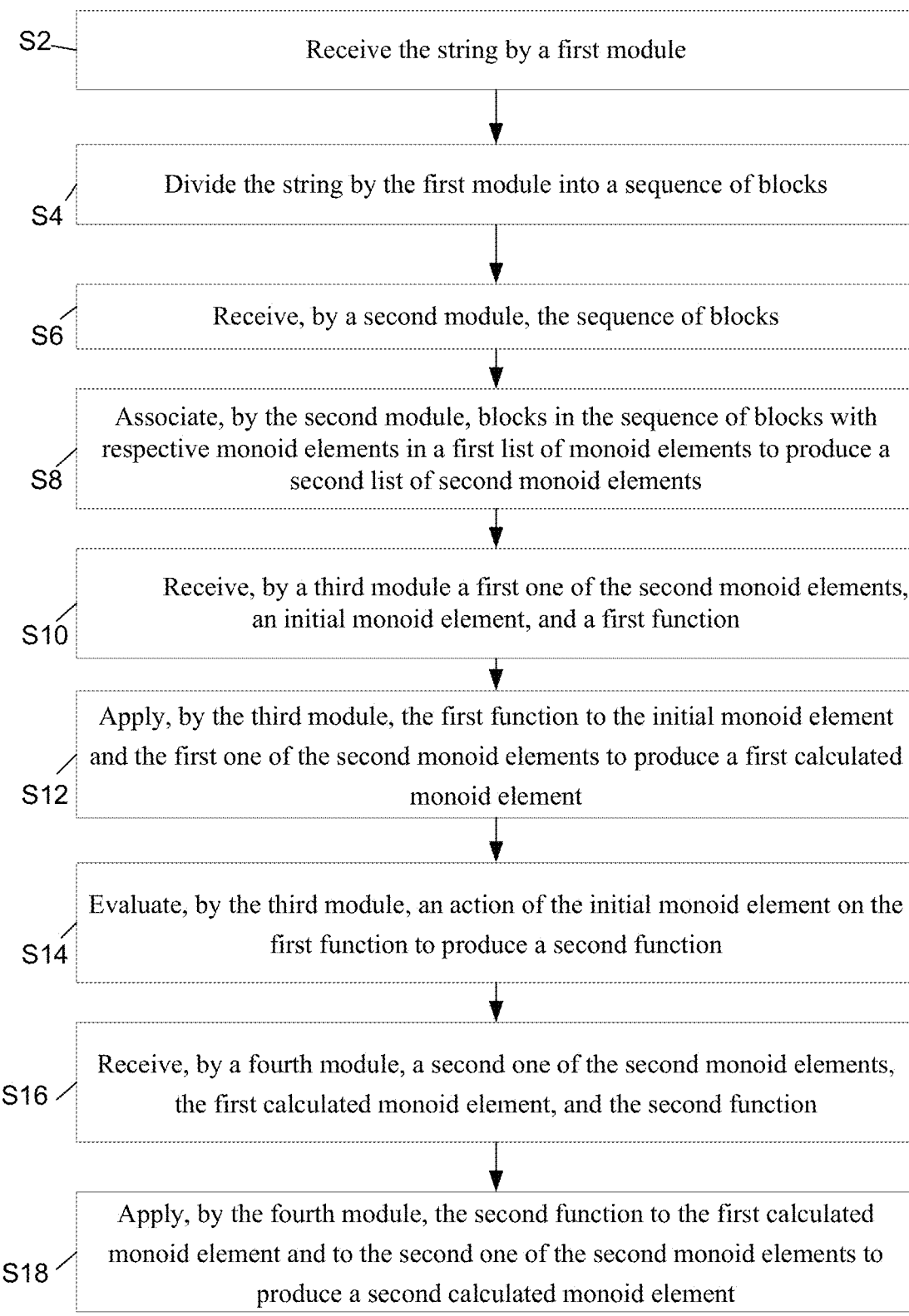
FIG. 2 is a flow diagram illustrating a process which could be performed in accordance with an embodiment of the invention.

Referring to FIG. 2, there is shown a process which could be performed in accordance with an embodiment of the invention. The process could be performed using, for example, system 100 discussed above and may be used to generate a hash of a string.

As shown, at step S2, a first module may receive a string to be hashed. At step S4, the first module may divide the string into a sequence of blocks. For example, the first module may divide the string into blocks of bits with an equal length.

At step S6, a second module may receive the sequence of blocks. At step S8, the second module may associate the blocks with respective monoid elements in a first list of first monoid elements to produce a second list of second monoid elements.

At step S10, a third module may receive a first one of the second monoid elements, an initial monoid element and a first function. At step S12, the third module may apply the function to the initial monoid element and to a first one of the second monoid elements to produce a first calculated monoid element.

At step S14, the third module may evaluate an action of the initial monoid element on the first function to produce a second function. At step S16, a fourth module may receive a second one of the second monoid elements, the first calculated monoid element and the second function. At step S18, the fourth module may apply the second function to the first calculated monoid element and to the second one of the second monoid elements to produce a second calculated monoid element.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device effective to generate a hash of a string, the device comprising:
   a memory, wherein the memory is effective to include
      a first function,
      a first list of first monoid elements, and
      an initial monoid element;
   a processor configured to be in communication with the memory, a decomposition module, a monoid list module, and a set of function modules that includes at least a first function module and a second function module;
   the decomposition module, when implemented with the processor, is effective to receive the string and divide the string into a sequence of blocks;
   the monoid list module in communication with the decomposition module and the memory, the monoid list module, when implemented with the processor, is effective to receive the sequence of blocks from the decomposition module, and in response, associate blocks in the sequence of blocks with respective monoid elements in the first list of first monoid elements to produce a second list of second monoid elements;
   the first function module in communication with the monoid list module and with the memory, the first function module, when implemented with the processor, is effective to:
      receive a first one of the second monoid elements from the monoid list module,
      receive the initial monoid element,
      receive the first function,
      apply the first function to the initial monoid element and the first one of the second monoid elements to produce a first calculated monoid element, and
      evaluate an action of the initial monoid element on the first function to produce a second function;
   the second function module in communication with the monoid list module and the first function module, the second function module, when implemented with the processor, is effective to:
      receive a second one of the second monoid elements from the monoid list module,
      receive the first calculated monoid element from the first function module,
      receive the second function from the first function module, and
      apply the second function to the first calculated monoid element and to the second one of the second monoid elements to produce a second calculated monoid element.

2. The device of claim 1, wherein
   the second function module, when implemented with the processor, is further effective to:
      receive the first function;
      evaluate the action of the first calculated monoid element on the first function to produce a third function;
      and the set of function modules further comprises:
   a third function module in communication with the monoid list module and the second function module, the third function module, when implemented with the processor being effective to:
      receive the third function from the second function module,
      receive a third one of the second monoid elements from the monoid list module,
      receive the second calculated monoid element from the second function module, and
      apply the third function to the second calculated monoid element and the third one of the second monoid elements to produce the hash of the string.

3. The device of claim 1, wherein:
   the decomposition module is further effective to add padding bits to the string; and
   each block in the sequence of blocks includes the same number of bits.

4. The device of claim 1, wherein the monoid list module is effective to:
   transform each block into a respective number; and
   associate the respective numbers with respective monoids in the first list of first monoid elements to produce the second list of second monoid elements.

5. The device of claim 1, wherein the first function is a one way function.

6. The device of claim 1, wherein the first function is a 6-tuple (M ⋉ S, N, Π, E, A, B) where
   M and N are monoids,
   S is a group that acts on M,
   M ⋉ S denotes the semi-direct product,
   A and B denote submonoids of M ⋉ S,
   Π denotes a monoid homomorphism from M to N,
   E is defined by $$E:(N \times S) \times (M \times S) \rightarrow (N \times S)$$

$$E((n,s),(m_1,s_1)) = (n\Pi(^E m_1), s\, s_1),$$

$$M = M \ltimes S, N = N \ltimes S,$$

and the function $\mathcal{F}_i$ is defined as: given $(n_0, s_0) \in N \ltimes S$ and $(m, s_1) \in M \ltimes S$ let $\mathcal{F}_i : N \times M \rightarrow N$ denote the function:

$$\mathcal{F}_i((n_0,s_0),(m,s_1)) = E((n_0,s_0),(m,s_1)) = ((n_0\Pi(^{s_0}m), s_0 s_1).$$

7. The device of claim 1, wherein the first function is selected such that monoids M and N are chosen to be a group G and $$\mathcal{F}_i(x,g) = g^{-1} x\, g$$

where x, g ∈ G.

8. A method for generating a hash of a string, the method comprising, by a processor:
   receiving the string;
   in response to receiving the string, implementing a decomposition module;
   sending the string to the decomposition module;
   controlling the decomposition module to divide the string into a sequence of blocks;
   in response to the division of the string into the sequence of blocks, implementing a monoid list module;
   transmitting the sequence of blocks from the decomposition module to the monoid list module;
   controlling the monoid list module to associate the blocks in the sequence of blocks with respective monoid elements in a first list of monoid elements to produce a second list of second monoid elements;
   in response to the association of the blocks in the sequence of blocks to the first list of monoid elements, implementing a set of function modules that includes at least a first function module and a second function module;

transmitting a first one of the second monoid elements from the monoid list module to the first function module;
transmitting an initial monoid element from a memory to the first function module;
transmitting a first function from the memory to the first function module;
controlling the first function module to apply the first function to the initial monoid element and to the first one of the second monoid elements to produce a first calculated monoid element;
controlling the first function module to evaluate an action of the initial monoid element on the first function to produce a second function;
transmitting a second one of the second monoid elements from the monoid list module to the second function module;
transmitting the first calculated monoid element from the first function module to the second function module;
transmitting the second function from the first function module to the second function module; and
controlling the second function module to apply the second function to the first calculated monoid element and to the second one of the second monoid elements to produce a second calculated monoid element.

9. The method of claim 8, further comprising:
transmitting the first function from the memory to the second function module;
controlling the second function module to evaluate an action of the first calculated monoid element on the first function to produce a third function;
implementing a third function module of the set of function modules;
transmitting the third function from the second function module to the third function module;
transmitting a third one of the second monoid elements from the monoid list module to the third function module;
transmitting the second calculated monoid element from the second function module to the third function module; and
controlling the third function module to apply the third function to the second calculated monoid element and the third one of the second monoid elements to produce the hash of the string.

10. The method of claim 8, further comprising:
padding, by the decomposition module, bits to the string; and wherein each block in the sequence of blocks includes the same number of bits.

11. The method of claim 8, further comprising:
transforming, by the monoid list module, each block into a respective number; and
associating, by the monoid list module, respective numbers with respective monoids in the first list of first monoid elements to produce the second list of second monoid elements.

12. The method of claim 8, wherein the first function is a one way function.

13. The method of claim 8, wherein the first function is a 6-tuple (M ⋊ S, N, Π, E, A, B) where
M and N are monoids,
S is a group that acts on M,
M ⋊ S denotes the semi-direct product,
A and B denote submonoids of M ⋊ S,
Π denotes a monoid homomorphism from M to N,
E is defined by $$E:(N\times S)\times(M\rtimes S)\to(N\times S)$$

$$E((n,s),(m_1,s_1))=(n\Pi(^s m_1), s\, s_1),$$

$$M=M\rtimes S,\ N=N\rtimes S,$$

and the function $\mathcal{F}_i$ is defined as: given $(n_0, s_0) \in N \rtimes S$ and $(m, s_1) \in M \rtimes S$ let $\mathcal{F}_i : N \times M \to N$ denote the function:

$$\mathcal{F}_i((n_0,s_0),(m,s_1))=E((n_0,s_0),(m,s_1))=((n_0\Pi(^{s_0}m), s_0 s_1).$$

14. The method of claim 8, wherein the first function is selected such that monoids M and N are chosen to be a group G and $$\mathcal{F}_i(x,g)=g^{-1}\,x\,g$$

where $x, g \in G$.

15. A system effective to communicate a hash of a string, the system comprising:
a first device; and
a second device in communication with the first device over a network;
the first device comprising:
a first memory, wherein the first memory is effective to include
a first function,
a first list of first monoid elements, and
an initial monoid element;
a first module effective to receive the string and divide the string into a sequence of blocks;
a second module in communication with the first module and the first memory, the second module effective to associate blocks in the sequence of blocks with respective monoid elements in the first list of monoid elements to produce a second list of second monoid elements;
a third module in communication with the second module and with the first memory, the third module effective to
receive a first one of the second monoid elements,
receive the initial monoid element,
receive the first function,
apply the first function to the initial monoid element and the first one of the second monoid elements to produce a first calculated monoid element, and
evaluate an action of the initial monoid element on the first function to produce a second function;
a fourth module in communication with the second module and the third module, the fourth module effective to
receive a second one of the second monoid elements,
receive the first calculated monoid element,
receive the second function,
apply the second function to the first calculated monoid element and to the second one of the second monoid elements to produce a second calculated monoid element,
receive the first function, and
evaluate the action of the first calculated monoid element on the first function to produce a third function;
a fifth module in communication with the second module and the fourth module, the fifth module effective to
receive the third function,
receive a third one of the second monoid elements,
receive the second calculated monoid element, and
apply the third function to the second calculated monoid element and the third one of the second monoid elements to produce the hash of the string;
the second device effective to
receive the hash; and compare the hash with data stored in a second memory in communication with the second device to produce an identification of the first device.

16. The system of claim 15, wherein the network is a near field communications network.

17. The system of claim 15, wherein:
the network is an RF-ID network,
the first device is one of a tag or a reader; and
the second device is the other of the tag or the reader.

18. The system of claim 15, wherein the first function is a 6-tuple $(M \ltimes S, N, \Pi, E, A, B)$ where
M and N are monoids,
S is a group that acts on M,
$M \ltimes S$ denotes the semi-direct product,
A and B denote submonoids of $M \ltimes S$,
$\Pi$ denotes a monoid homomorphism from M to N,
E is defined by $$E:(N \times S) \times (M \ltimes S) \to (N \times S)$$

$$E((n,s),(m_1,s_1)) = (n\Pi(^E m_1), s\, s_1),$$

$$M = M \ltimes S, N = N \ltimes S,$$

and the function $\mathcal{F}_i$ is defined as: given $(n_0, s_0) \in N \ltimes S$ and $(m, s_1) \in M \ltimes S$ let $\mathcal{F}_i : N \times M \to N$ denote the function:

$$\mathcal{F}_i((n_0, s_0),(m, s_1)) = E((n_0, s_0),(m, s_1)) = ((n_0 \Pi(^{s_0} m), s_0 s_1).$$

19. The system of claim 15, wherein:
the first module is further effective to add padding bits to the string; and
each block in the sequence of blocks includes the same number of bits.

20. The system of claim 15, wherein
the second module is effective to transform each block into a respective number; and
associate the respective numbers with respective monoids in the first list of first monoid elements to produce the second list of second monoid elements.

* * * * *